United States Patent
Mueller et al.

(10) Patent No.: US 10,083,398 B2
(45) Date of Patent: Sep. 25, 2018

(54) FRAMEWORK FOR ANNOTATED-TEXT SEARCH USING INDEXED PARALLEL FIELDS

(71) Applicant: International Business Machines Corporation, Armonk, NY (US)

(72) Inventors: Kay Mueller, Dublin (IE); Christopher M. Nolan, Acton, MA (US); William G. Visotski, Merrimack, NH (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 14/569,690

(22) Filed: Dec. 13, 2014

(65) Prior Publication Data

US 2016/0171092 A1   Jun. 16, 2016

(51) Int. Cl.
G06F 17/24 (2006.01)
G06N 5/02 (2006.01)
G06F 17/22 (2006.01)
G06F 17/30 (2006.01)

(52) U.S. Cl.
CPC ......... *G06N 5/022* (2013.01); *G06F 17/2247* (2013.01); *G06F 17/2288* (2013.01); *G06F 17/241* (2013.01); *G06F 17/30* (2013.01); *G06F 17/30023* (2013.01)

(58) Field of Classification Search
CPC .............. G06F 17/241; G06F 17/2288; G06F 17/2247; G06F 17/242; G06F 17/30; G06F 17/30023; G06N 5/022
See application file for complete search history.

(56) References Cited

U.S. PATENT DOCUMENTS

| | | | |
|---|---|---|---|
| 9,336,269 B1* | 5/2016 | Smith | G06F 17/30424 |
| 2007/0118795 A1* | 5/2007 | Noyes | G06F 17/241 |
| | | | 715/203 |
| 2007/0208994 A1* | 9/2007 | Reddel | G06F 17/2288 |
| | | | 715/205 |
| 2007/0245230 A1* | 10/2007 | Cherkasov | G06F 17/30011 |
| | | | 715/205 |
| 2008/0174815 A1* | 7/2008 | Komaki | G06F 17/241 |
| | | | 358/1.15 |
| 2010/0005077 A1 | 1/2010 | Krishnamurthy et al. | |
| 2012/0089629 A1* | 4/2012 | Koll | G06F 17/3064 |
| | | | 707/760 |
| 2013/0018891 A1 | 1/2013 | Busch et al. | |

(Continued)

OTHER PUBLICATIONS

Mao et al., "Parallel Field Alignment for Cross Media Retrieval," MM'13, Proceedings of the 21st ACM international conference on Multimedia, Oct. 21-25, 2013, Barcelona Spain, pp. 897-906.

*Primary Examiner* — Thu Huynh
(74) *Attorney, Agent, or Firm* — VanLeeuwen & VanLeeuwen; Diana R. Gerhardt

(57) ABSTRACT

An approach is provided in which a knowledge manager generates term tokens from terms included in an original text stream, and generates annotation tokens with corresponding term location information. In turn, the knowledge manager generates a knowledge structure that indexes the term tokens into original text fields and indexes the annotation tokens into parallel fields that align to the original text fields based upon the term location information.

14 Claims, 8 Drawing Sheets

(56) References Cited

U.S. PATENT DOCUMENTS

| | | | |
|---|---|---|---|
| 2013/0262449 A1* | 10/2013 | Arroyo | G06F 17/30442 707/722 |
| 2014/0115436 A1* | 4/2014 | Beaver | G06F 17/2288 715/229 |
| 2014/0122455 A1 | 5/2014 | Leitner et al. | |
| 2014/0201148 A1* | 7/2014 | Doui | G06F 17/30011 707/638 |
| 2016/0070784 A1* | 3/2016 | Hu | G06F 11/3003 707/758 |
| 2016/0078102 A1* | 3/2016 | Crouch | G06F 17/30616 707/722 |

\* cited by examiner

Knowledge Structure 330

| | 500 | 510 | 520 | 530 | 540 | 550 |
|---|---|---|---|---|---|---|
| | Pos. | Original Text Term (Term Location Inf.) | Pos Inc | Annotation TYPE: Entity (Term Location Inf.) | Pos Inc | Annotation TYPE:... |
| | 1 | Barack (0,6) | 1 | PERSON (0,12) | 1 | |
| | 2 | Obama (7,12) | 1 | | | |
| | 3 | is (13,15) | 1 | | | |
| | 4 | the (16,19) | 1 | | | |
| | 5 | president (20,29) | 1 | PERSON (20,29)<br>OCCUPATION (20,29) | 4,<br>0 | |
| | 6 | of (30,32) | 1 | | | |
| | 7 | the (33,36) | 1 | | | |
| | 8 | United (37,43) | 1 | GEOPOLITICAL ENTITY (37,50)<br>ORGANIZATION (37,50)<br>COUNTRY (37,50) | 3,<br>0,<br>0 | |
| | 9 | States (44,50) | 1 | | | |

```
LOOP: While (more input tokens OR token queue size > 0 OR annotation queue size > 0) {
    IF (more input tokens AND false == firstAnnotation ) {
        Capture current token state
        Offer state to token queue
    }
    IF (token queue size > 0) {
        Poll token queue
        IF (annotation queue size > 0) {
            Poll annotation queue
            Set annotationText to AnnotationToken.value
            Set annotationOffsets to AnnotationToken offsets
            IF (firstAnnotation == TRUE) {
                Set pos_inc attribute = input pos_inc + skipped tokens counter
                Set firstAnnotation = false
            }
            ELSE {
                Set pos_inc attribute = 0
            }
            IF (annotation queue size > 0) {
                Capture current token state
                Offer state to first position in token queue
            }
            return TRUE
        }
    }
    IF (engine has annotations located at input token position){
        Offer annotation token objects to annotation queue
        Capture current token state
        Offer state to first position in token queue
        Set firstAnnotation = TRUE;
    }
    ELSE {
        Increment skipped tokens counter
        Increment to next input token
    }
}
return FALSE
```

*FIG. 6*

FRAMEWORK FOR ANNOTATED-TEXT SEARCH USING INDEXED PARALLEL FIELDS

BACKGROUND

Information retrieval and question answering systems search on annotations as a way to incorporate metadata, entity information, or additional knowledge into searches to improve information recall and answering precision. Software developers may link annotations to documents using a variety of approaches, such as storing the annotations as metadata, storing the annotations in separate structured resources, or inserting the annotations into the document via tags.

Software developers may also add term location information to annotations that indicate locations of the annotations' corresponding terms (e.g., words) in a document or original text stream. For example, if a first sentence in a document is "Barack Obama is the president of the United States," an annotation of "PERSON" may be linked to the term(s) Barack Obama and include term location information of "0,12", which indicates that the annotation's corresponding term starts at character position 0 and ends at character position 12. As those skilled in the art can appreciate, software developers may use other approaches to note term location information, such as by using a character start location and a span value that identifies the number of characters in a corresponding term.

BRIEF SUMMARY

According to one embodiment of the present disclosure, an approach is provided in which a knowledge manager generates term tokens from terms included in an original text stream, and generates annotation tokens with corresponding term location information. In turn, the knowledge manager generates a knowledge structure that indexes the term tokens into original text fields and indexes the annotation tokens into parallel fields that align to the original text fields based upon the term location information.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting a knowledge structure;

FIG. 6 is an exemplary diagram depicting an alignment algorithm that generates an ordered annotated token stream;

DETAILED DESCRIPTION

Figure 1:
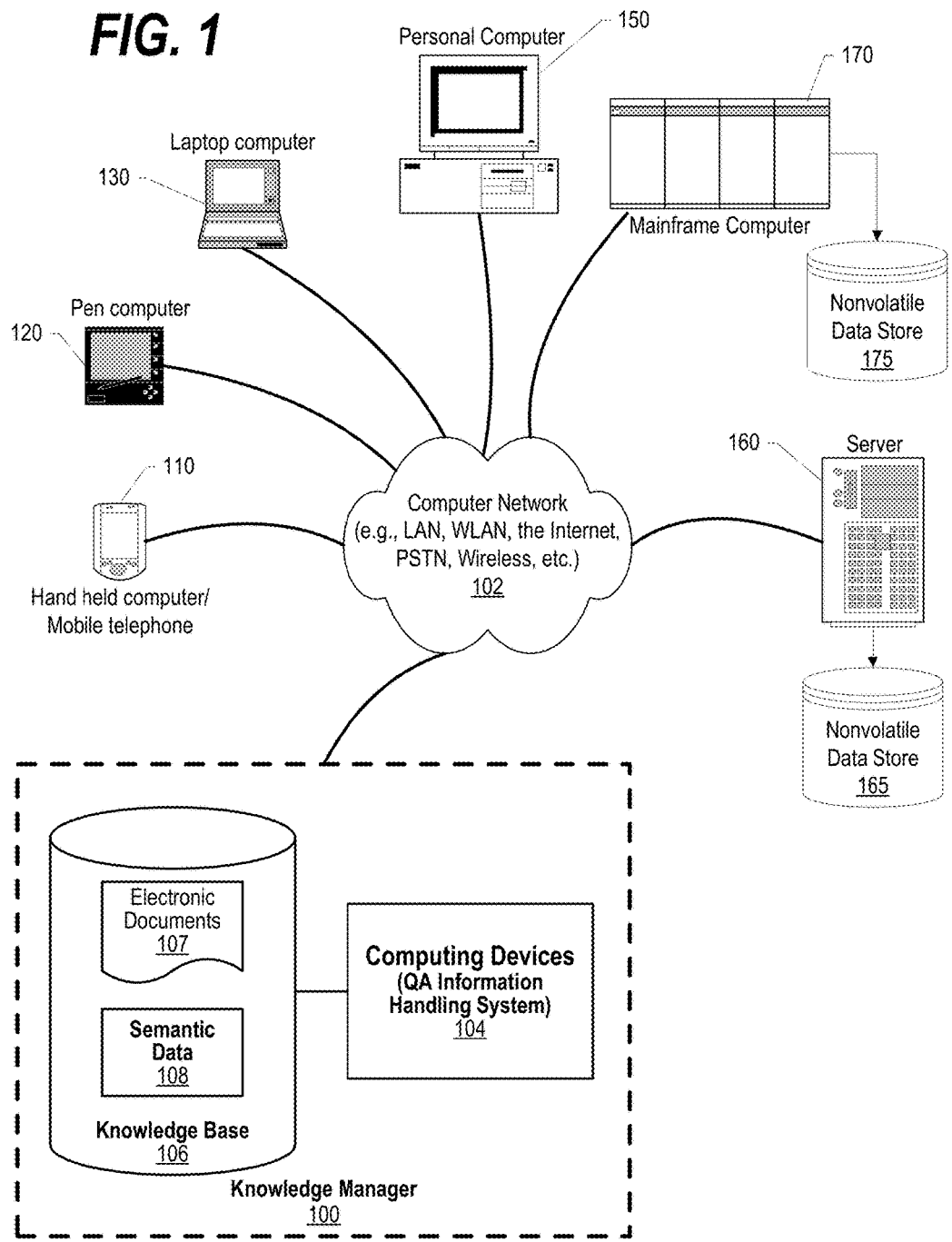
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
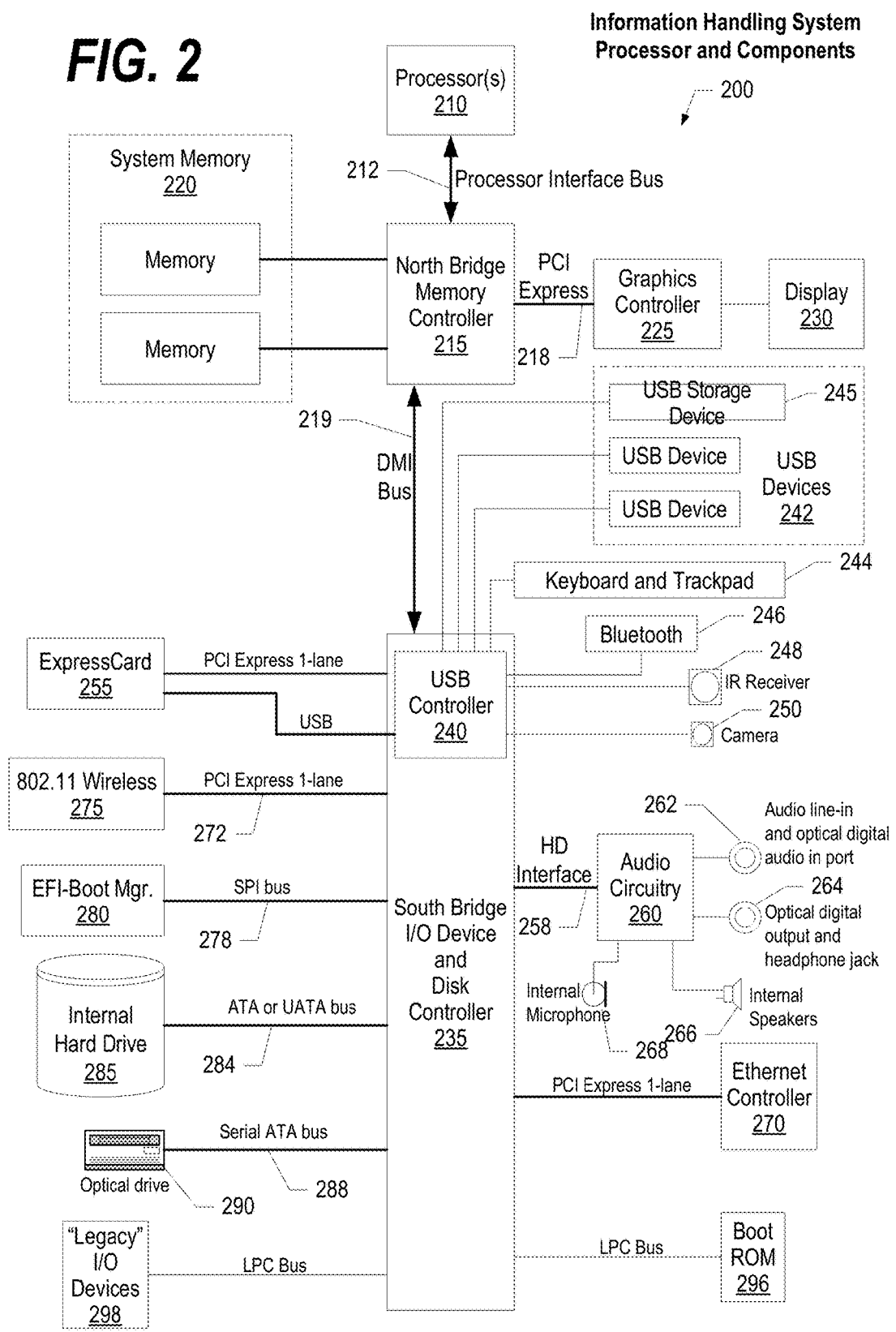
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. The information handling generates term tokens from terms included in an original text stream. The term tokens include terms and term location information that indicate the location of the corresponding term in the original text stream. The knowledge manager also generates annotation tokens from annotations, which include the term location information of the annotations' corresponding terms. In turn, the knowledge manager generates a knowledge structure that stores the term tokens in original text fields and stores the annotation tokens in parallel fields that align to the original text fields based upon the term location information. In one embodiment, the knowledge manager queries the knowledge structure for information retrieval or question answer results. In this embodiment, the knowledge manager generates sub queries for a set of terms and annotation types, and then forms a complex query from the sub queries to query the knowledge structure.

Figure 3:
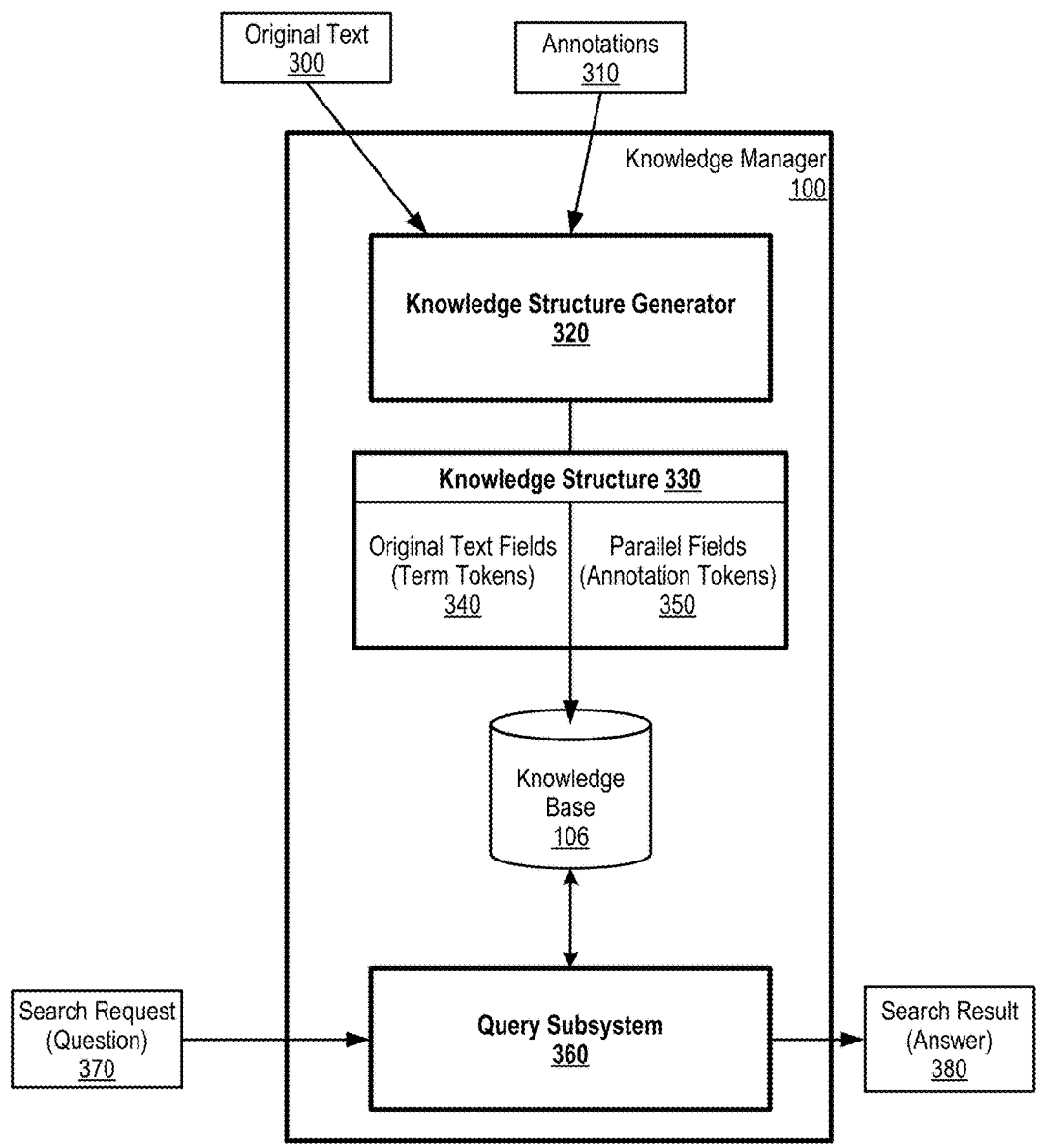
FIG. 3 is an exemplary diagram depicting a knowledge manager that creates a knowledge structure having parallel fields and providing annotations with term position resolution.

FIG. 3 is an exemplary diagram depicting a knowledge manager that creates a knowledge structure having parallel fields and providing annotations with term position resolution. Knowledge manager 100 incorporates arbitrary annotations (annotations 310) into parallel fields in knowledge structure 330, which knowledge manager 100 utilizes to perform annotated-text searches on the parallel fields. As discussed herein, knowledge manager 100 may be an information retrieval system, a question answer system, or other type of system that receives a request and provides results for the request.

Knowledge manager 100 uses knowledge structure generator 320 to generate term tokens from terms included in original text 300 and index the term tokens into original text fields 340. The term tokens include term location information, such as span and offset information, for their corresponding terms (see FIG. 5 and corresponding text for further details). Knowledge structure generator 320 also generates annotation tokens from annotations 310 and indexes the annotation tokens into parallel fields 350.

In one embodiment, knowledge structure generator 320 utilizes a specific algorithm to align positions and offsets of multiple annotation tokens exactly to the term tokens. Knowledge structure generator 320 stores knowledge structure 330 in knowledge base 106 for subsequent utilization by query subsystem 360.

Knowledge structure 330 provides full term position resolution to query subsystem 360 to make use of exact spans and positions to find query terms that align with specific annotations. In addition, the original text is unaffected because knowledge structure generator 320 indexes the annotations into separate parallel fields. In one embodiment, knowledge structure 330 includes multiple sets of parallel fields for multiple annotation types. For example, knowledge structure 330 may include a first set of parallel fields to store entity annotation types and a second set of parallel fields to store synonym annotation types (see FIG. 5 and corresponding text for further details).

Query subsystem 360 receives search request 370 and determines a set of annotations/annotation types and a set of terms for which to search. Query subsystem 360 generates sub queries for the various annotation types and terms and, in one embodiment, aggregates the sub queries into a complex query that may factor in a desired set of parameters such as relative annotation positions, weightings, etc. In another embodiment, each sub query uses annotation-specific information, such as varying slop values (the number of non-relevant terms allowed between query terms), annotation-specific boosting for each parallel field, and differing required or optional terms. In this embodiment, the sub queries are then nested or combined to form the complex query. Query sub system 360, in turn, generates search results 380 based upon the query results from the complex query (see FIGS. 8, 9, and corresponding text for further details).

Figure 4:
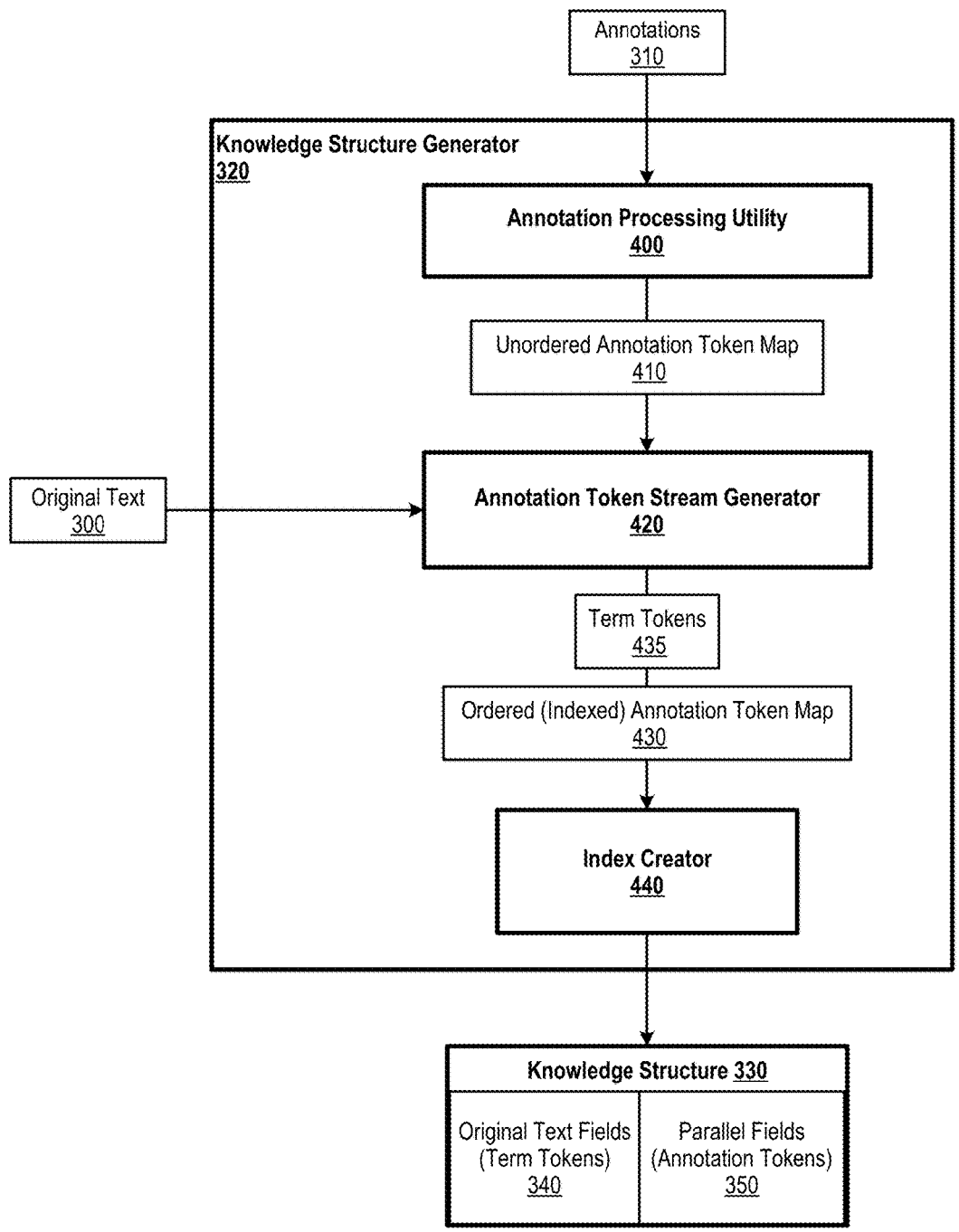
FIG. 4 is an exemplary diagram depicting a knowledge structure generator generating a knowledge structure.

FIG. 4 is an exemplary diagram depicting a knowledge structure generator generating a knowledge structure. Knowledge structure generator 320 receives annotations 310 and uses annotation processing utility 400 to create unordered annotation token map 410. In one embodiment, unordered annotation token map 410 includes a list of annotation tokens organized by annotation type. For example, unordered annotation map 410 may be in the form of <fieldname>, List<AnnotationToken> wherein the field name is the annotation type (e.g., Entity type) and the list is a list of entity type annotations with their corresponding term location information.

Knowledge structure generator 320 uses annotation token stream generator 420 to align (index) the annotation tokens to the original text stream and create ordered annotation token map 430. Annotation token stream generator 420 generates term tokens 435 from the terms included in original text 300 and uses an alignment algorithm to position term tokens 435 with the corresponding alignment tokens from unordered annotation token map 410 (see FIG. 6 and corresponding text for further details). In one embodiment, ordered annotation token map 430 is in the form of a data engine that is a machine-readable mapping organized by annotation type.

Index creator 440 uses ordered annotation token map 430 and term tokens 435 from original text stream 300 to create knowledge structure 330. Index creator 440 indexes term tokens 435 into original text fields 340 based on their position (position 1, 2, . . . ) and indexes the annotation tokens into their respective parallel fields based upon their aligned position assigned by annotation token stream generator 420 (see FIG. 5 and corresponding text for further details).

As such, knowledge manager 100 performs queries on knowledge structure 330 based on terms and annotations to improve and refine query results. In addition, knowledge manager 100 may retrieve specific terms corresponding to query matched annotations due to the alignment nature of knowledge structure 330 (see FIGS. 8, 9, and corresponding text for further details).

FIG. 5 is an exemplary diagram depicting a knowledge structure. Knowledge structure 330 includes columns 500, 510, 520, 530, 540, and 550. As those skilled in the art can appreciate, knowledge structure 330 may take on other forms such as a data array, a database, or other type of structure that allows annotation tokens to align with term tokens at a term position resolution.

Column 500 includes a list of term positions of original text. The example shown in FIG. 1 is of a first sentence in a document. As such, the first term "Barack" located at the first position. Column 510 includes original text fields and corresponding term tokens. Each term token includes a term and term location information that indicates the term location in the original text stream. Column 520 includes a list of position increments that indicate the number of positions between the term tokens. Each of the position increments are "1" because a term token is stored in each original text field position.

Column 530 includes a set of parallel fields that store annotation tokens of annotation type "Entity" and align to their corresponding text token in column 510. Each annotation token includes an annotation and term location information that, as shown in the first position, may encompass more than one term token. As can be seen, the annotation token PERSON aligns with locations 0 through 12, which includes both the Barack term token and Obama term token. Position 5's corresponding parallel field shows that multiple annotation tokens may be aligned with a single term token, such as PERSON and OCCUPATION aligned with president.

Column 540 includes a list of position increments corresponding to the annotation tokens in column 530 that indicate the number of positions between annotation tokens. As such, the position increments for position 8 start at "3" because the GEOPOLITICAL ENTITY is three positions away from OCCUPATION (position 4). ORGANIZATION and COUNTRY have position increments of 0 because they are in the same position as GEOPOLITICAL ENTITY.

Column 550 includes parallel fields for another annotation type, such as a synonym annotation type, an abbreviation annotation type, etc. As such, knowledge structure 330 may align multiple annotation types to a single term token without affecting the original term text. Other annotation types may be, for example, concept annotation types (e.g., canonical name of an entity), sentiment annotation types, geospatial coordinate annotation types, syntactic-relationship structure annotation types (e.g., subject-object-predicate relationships), and co-references annotation types (e.g., pronoun resolution).

FIG. 6 is an exemplary diagram depicting an alignment algorithm that generates an ordered annotated token stream. As those skilled in the art can appreciate, knowledge manager 100 may use different algorithms than algorithm 600 to align annotation tokens to text tokens depending upon the implementation system.

Algorithm 600 takes unordered annotation token map 410 for a particular annotation type and generates ordered annotation token map 430 that aligns to corresponding term tokens 435 by evaluating term positions of the terms and assigning the term positions to the corresponding annotation tokens. Algorithm 600 uses two queues to process the input sets of term tokens and annotation tokens. The first queue holds the incoming text token and the second queue holds the set of annotations.

A third data structure, referred to as a token stream, holds the ordered annotation tokens for output. Algorithm 600 iterates over each input text queue and checks whether a set of annotation tokens exist within the unordered annotation token map 410 at the starting offset of the input token. If no annotation tokens exist, then the position increment counter increments by one and algorithm 600 processes the next input token off the text queue.

If unordered annotation token map 410 includes annotation tokens at the starting offset, then algorithm 600 adds the corresponding set of annotation tokens to the annotation queue. The first annotation is taken off the queue and aligned to the character offset and positions of the text token, resulting in an annotation output token that is added to the token stream. If unordered annotation token map 410 includes more annotation tokens at the same position, then the text token is added back to the front of the text queue for reprocessing during the next loop. This process continues until each annotation token is processed and added in order to the output token stream.

Figure 7:
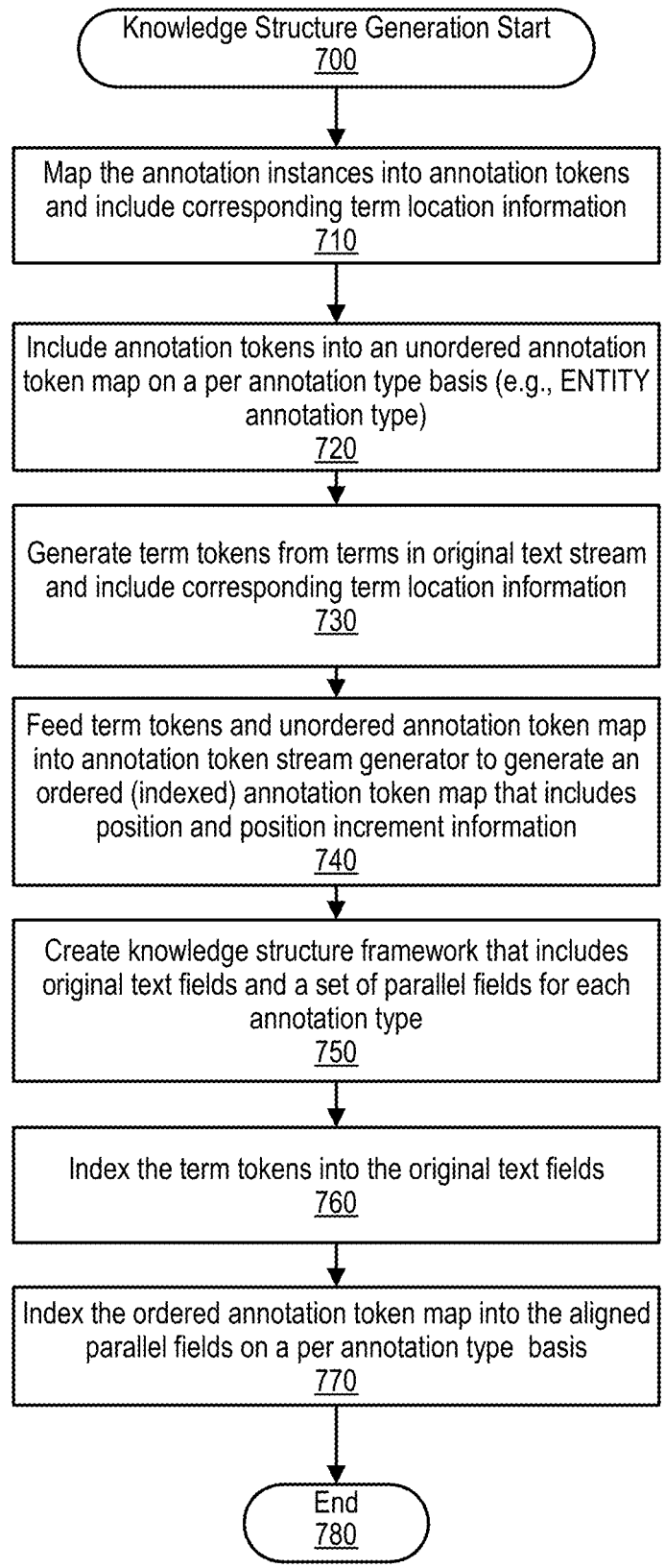
FIG. 7 is a flowchart showing steps taken by a knowledge manager to generate a knowledge structure using original text and corresponding annotations.

FIG. 7 is a flowchart showing steps taken by a knowledge manager to generate a knowledge structure using original text and corresponding annotations. In one embodiment, the original text is an original text stream extracted from a document, such as during a document ingestion stage.

Processing commences at 700, whereupon the process maps the incoming annotation instances with corresponding term location information (e.g., spans and offsets) into annotation tokens. At step 720, the process includes the annotation tokens into an unordered annotation token map on a per annotation type basis (e.g., entity annotation type, synonym annotation type, etc.).

At step 730, the process generates term tokens from the original text stream. In one embodiment, each term corresponds to a word in the original text stream and the term tokens include the term location information corresponding to the location of the term within the original text stream. At step 740, the process feeds the term tokens and the unordered annotation token map into the annotation token stream generator to generate an ordered annotation token map. In one embodiment, the annotation token stream generator uses an algorithm such as that shown in FIG. 6 to generate the ordered annotation token map.

At step 750, the process creates a knowledge structure framework that includes original text fields and a set of parallel fields for each annotation type, such as knowledge structure 330 shown in FIG. 5. At step 760, the process indexes the term tokens into the original text fields and, at step 770, the process indexes the ordered annotation token map into their respective parallel fields. As such, the parallel fields are aligned to the original text fields based upon the term location information, thus providing the annotations with term position resolution for post processing tasks such as for retrieving original text that corresponds to annotation token query matches. FIG. 7 processing thereafter ends at 780.

Figure 8:
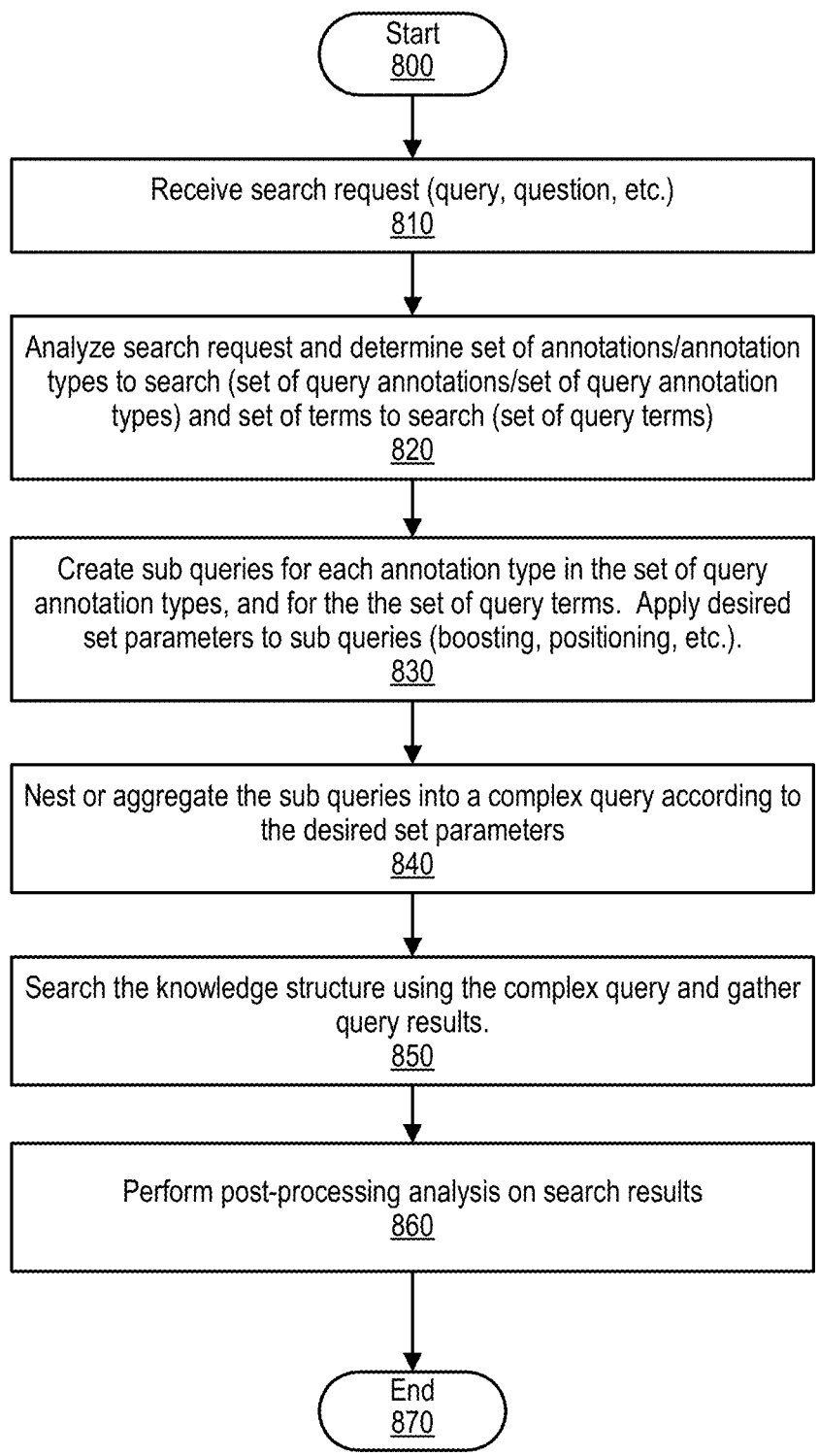
FIG. 8 is a flowchart showing steps taken by a knowledge manager to perform a query on the knowledge structure.

FIG. 8 is a flowchart showing steps taken by a knowledge manager to perform a query on the knowledge structure. Processing commences at 800, whereupon the process receives a search request at step 810. In one embodiment, the search request may be a question that the knowledge manager analyzes using techniques such as natural language processing to understand the context and meaning of the question. In this embodiment, the knowledge manager may generate a search request based upon the results of analyzing the question.

At step 820, the process analyzes the search request and determines a set of annotations/annotation types to search (annotation search sets) and a set of terms to search (term search set). For example, the search request may correspond to multiple entity type annotations (PERSON, OCCUPATION, etc.), synonym type annotations, etc. and, in one embodiment, the process generates an annotation search set for each annotation type.

At step 830, the process creates sub queries for each annotation type corresponding to the annotation search sets and also creates a sub query for the term search sets. In one embodiment, the process applies a desired set configuration, such as adding weighting to particular annotations, terms, etc., and may also include relative position requirements that require annotation tokens to be within a certain position offset from each other. At step 840, the process nests or aggregates the sub queries into a complex query according to the desired set configuration.

At step 850, the process searches the knowledge structure using the complex query and gathers query results. The query results include results from the term query as well as results from the annotation queries. At step 870, the process refines the query results through post-processing analysis. For example, if search request 370 corresponds to a question that was determined to be about a specific type of entity, such as "Who is the president of the United States?", then the lexical answer type (LAT) is PERSON, and the matching PERSON entities from passages are used to create "Candidate Answers" for a question answer system. In another example, if the question was about sentiment, then the sentiment annotation tokens in the parallel fields are used to filter out possible answers that don't apply.

In yet another embodiment that utilizes co-reference resolution and the passage states "He is the president of the United States," the co-reference parallel field includes "Barack H. Obama" which gives the exact answer. In yet another example, a passage may state "Obama became the 44th president of the United States." In this example, Obama is the answer from the passage but is not the president's full name, so "Barack Hussein Obama" is included in the annotation token and used to generate a candidate answer.

In yet another embodiment, the process uses geospatial annotation types to filter results. For example, given a question about Charleston, S.C. and a passage about Charleston W. Va. is part of the query results, the process uses geospatial coordinates from a geospatial annotation token to determine that the entity is from a different location at the passage and term level. FIG. 8 processing ends at 880.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

generating a plurality of term tokens from a plurality of terms that are located at a plurality of term locations in an original text stream;

generating a plurality of annotation tokens from a plurality of annotations corresponding to the plurality of terms, wherein each of the plurality of annotation tokens includes term location information based on one or more of the plurality of term locations of its corresponding one or more of the plurality of terms;

generating a knowledge structure that stores the plurality of term tokens in a plurality of original text fields and stores the plurality of annotation tokens in a plurality of parallel fields, wherein each of the plurality of annotation tokens align to at least one of the plurality of original text fields based upon its corresponding term location information;

receiving a search request that comprises a set of query terms, a set of query annotation types, and a relative annotation position parameter;

creating a plurality of sub queries based on the set of query terms and the set of query annotation types;

searching the knowledge structure using the plurality of sub queries, resulting in one or more term token matches and one or more annotation token matches; and generating search results based upon the one or more term token matches and the one or more annotation token matches, wherein the generation of the search results further comprises:

determining that a first one of the plurality of annotation tokens corresponds to one of the plurality of sub queries;

identifying a position increment value corresponding to the first annotation token, wherein the position increment value indicates a relative position of the first annotation token to a second annotation token; and including the first annotation token in the search results in response to determining that the position increment value adheres to the relative annotation position parameter.

2. The method of claim 1 wherein a first one of the one or more annotation token matches corresponds to a first annotation type and a second one of the one or more annotation token matches corresponds to a second annotation type.

3. The method of claim 2 wherein the first annotation type is selected from the group consisting of an entity annotation type, a synonym annotation type, an abbreviation annotation type, a concept annotation type, a sentiment annotation type, a geospatial coordinate annotation type, a syntactic-relationship structure annotation type, and a co-reference annotation type.

4. The method of claim 1 wherein the generation of the knowledge structure further comprises:

adding a first set of parallel fields to the knowledge structure, the first set of parallel fields comprised in the plurality of parallel fields;

indexing a first set of annotation tokens corresponding to the first annotation type into the first set of parallel fields;

adding a second set of parallel fields to the knowledge structure, the second set of parallel fields comprised in the plurality of parallel fields; and indexing a second set of annotation tokens corresponding to the second annotation type into the second set of parallel fields, wherein the first set of annotation tokens and the second set of annotation tokens are included in the plurality of annotation tokens.

5. The method of claim 4 wherein a plurality of the first set of annotation tokens are indexed into a single parallel field in the first set of parallel fields.

6. The method of claim 1 further comprising:

selecting an annotation token match from the one or more annotation token matches;

identifying one of the plurality of term tokens that align to the selected annotation token;

extracting the term from the identified term token; and including the extracted term in the generation of the search results.

7. An information handling system comprising:

one or more processors;

a memory coupled to at least one of the processors; and a set of computer program instructions stored in the memory and executed by at least one of the processors in order to perform actions of:

generating a plurality of term tokens from a plurality of terms that are located at a plurality of term locations in an original text stream;

generating a plurality of annotation tokens from a plurality of annotations corresponding to the plurality of terms, wherein each of the plurality of annotation tokens includes term location information based on one or more of the plurality of term locations of its corresponding one or more of the plurality of terms;

generating a knowledge structure that stores the plurality of term tokens in a plurality of original text fields and stores the plurality of annotation tokens in a plurality of parallel fields, wherein each of the plurality of annotation tokens align to at least one of the plurality of original text fields based upon its corresponding term location information;

receiving a search request that comprises a set of query terms, a set of query annotation types, and a relative annotation position parameter;

creating a plurality of sub queries based on the set of query terms and the set of query annotation types;

searching the knowledge structure using the plurality of sub queries, resulting in one or more term token matches and one or more annotation token matches; and generating search results based upon the one or more term token matches and the one or more annotation token matches, wherein the generation of the search results further comprises:

determining that a first one of the plurality of annotation tokens corresponds to one of the plurality of sub queries;

identifying a position increment value corresponding to the first annotation token, wherein the position increment value indicates a relative position of the first annotation token to a second annotation token; and including the first annotation token in the search results in response to determining that the position increment value adheres to the relative annotation position parameter.

8. The information handling system of claim 7 wherein a first one of the one or more annotation token matches corresponds to a first annotation type and a second one of the one or more annotation token matches corresponds to a second annotation type, and wherein the first annotation type is selected from the group consisting of an entity annotation type, a synonym annotation type, an abbreviation annotation type, a concept annotation type, a sentiment annotation type, a geospatial coordinate annotation type, a syntactic-relationship structure annotation type, and a co-reference annotation type.

9. The information handling system of claim 7 wherein the one or more processors perform additional actions comprising:
adding a first set of parallel fields to the knowledge structure, the first set of parallel fields comprised in the plurality of parallel fields;
indexing a first set of annotation tokens corresponding to the first annotation type into the first set of parallel fields;
adding a second set of parallel fields to the knowledge structure, the second set of parallel fields comprised in the plurality of parallel fields; and
indexing a second set of annotation tokens corresponding to the second annotation type into the second set of parallel fields, wherein the first set of annotation tokens and the second set of annotation tokens are included in the plurality of annotation tokens.

10. The information handling system of claim 7 wherein the one or more processors perform additional actions comprising:
selecting an annotation token match from the one or more annotation token matches;
identifying one of the plurality of term tokens that align to the selected annotation token;
extracting the term from the identified term token; and
including the extracted term in the generation of the search results.

11. A computer program product stored in a computer readable storage medium, comprising computer program code that, when executed by an information handling system, causes the information handling system to perform actions comprising:
generating a plurality of term tokens from a plurality of terms that are located at a plurality of term locations in an original text stream;
generating a plurality of annotation tokens from a plurality of annotations corresponding to the plurality of terms, wherein each of the plurality of annotation tokens includes term location information based on one or more of the plurality of term locations of its corresponding one or more of the plurality of terms;
generating a knowledge structure that stores the plurality of term tokens in a plurality of original text fields and stores the plurality of annotation tokens in a plurality of parallel fields, wherein each of the plurality of annotation tokens align to at least one of the plurality of original text fields based upon its corresponding term location information;
receiving a search request that comprises a set of query terms, a set of query annotation types, and a relative annotation position parameter;
creating a plurality of sub queries based on the set of query terms and the set of query annotation types;
searching the knowledge structure using the plurality of sub queries, resulting in one or more term token matches and one or more annotation token matches; and
generating search results based upon the one or more term token matches and the one or more annotation token matches, wherein the generation of the search results further comprises:
determining that a first one of the plurality of annotation tokens corresponds to one of the plurality of sub queries;
identifying a position increment value corresponding to the first annotation token, wherein the position increment value indicates a relative position of the first annotation token to a second annotation token; and
including the first annotation token in the search results in response to determining that the position increment value adheres to the relative annotation position parameter.

12. The computer program product of claim 11 wherein a first one of the one or more annotation token matches corresponds to a first annotation type and a second one of the one or more annotation token matches corresponds to a second annotation type, and wherein the first annotation type is selected from the group consisting of an entity annotation type, a synonym annotation type, an abbreviation annotation type, a concept annotation type, a sentiment annotation type, a geospatial coordinate annotation type, a syntactic-relationship structure annotation type, and a co-reference annotation type.

13. The computer program product of claim 11 wherein the information handling system performs additional actions comprising:
adding a first set of parallel fields to the knowledge structure, the first set of parallel fields comprised in the plurality of parallel fields;
indexing a first set of annotation tokens corresponding to the first annotation type into the first set of parallel fields;
adding a second set of parallel fields to the knowledge structure, the second set of parallel fields comprised in the plurality of parallel fields; and
indexing a second set of annotation tokens corresponding to the second annotation type into the second set of parallel fields, wherein the first set of annotation tokens and the second set of annotation tokens are included in the plurality of annotation tokens.

14. The computer program product of claim 11 wherein the information handling system performs additional actions comprising:
selecting an annotation token match from the one or more annotation token matches;
identifying one of the plurality of term tokens that align to the selected annotation token;
extracting the term from the identified term token; and
including the extracted term in the generation of the search results.

* * * * *